United States Patent
Holzer et al.

(10) Patent No.: US 10,585,547 B2
(45) Date of Patent: Mar. 10, 2020

(54) CUSTOMIZING THE VISUAL AND FUNCTIONAL EXPERIENCE OF AN APPLICATION

(71) Applicant: Fyusion, Inc., San Francisco, CA (US)

(72) Inventors: Stefan Johannes Josef Holzer, San Mateo, CA (US); Michelle Ho, San Francisco, CA (US); Pantelis Kalogiros, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 324 days.

(21) Appl. No.: 14/798,872

(22) Filed: Jul. 14, 2015

(65) Prior Publication Data

US 2017/0017353 A1    Jan. 19, 2017

(51) Int. Cl.
*G06F 3/048* (2013.01)
*G06F 9/451* (2018.01)
*G06F 3/0481* (2013.01)

(52) U.S. Cl.
CPC ............ *G06F 3/0481* (2013.01); *G06F 9/451* (2018.02)

(58) Field of Classification Search
CPC . G06F 3/048; G06F 3/00; G06F 17/30; G06F 9/00; G06Q 30/00; G06Q 50/00
See application file for complete search history.

(56) References Cited

U.S. PATENT DOCUMENTS

| | | | |
|---|---|---|---|
| 7,197,715 B1 | 3/2007 | Valeria | |
| 7,620,894 B1 * | 11/2009 | Kahn | G06F 3/0481 715/707 |
| 9,400,660 B1 * | 7/2016 | Krivopaltsev | G06F 3/04842 |
| 9,513,763 B1 * | 12/2016 | Adams | G06F 3/0481 |
| 2003/0005002 A1 * | 1/2003 | Chen | G06F 17/212 715/234 |
| 2011/0179373 A1 * | 7/2011 | Moore | G06F 1/3203 715/773 |
| 2012/0287039 A1 * | 11/2012 | Brown | G06F 3/0488 345/156 |
| 2012/0311470 A1 * | 12/2012 | Roberts | H04N 21/42218 715/763 |
| 2013/0038564 A1 * | 2/2013 | Ho | G06F 3/0488 345/174 |

(Continued)

OTHER PUBLICATIONS

"International Application Serial No. PCT/US16/41948, International Search Report and Written Opinion dated Sep. 16, 2016", 8 pages.

*Primary Examiner* — Hugo Molina
(74) *Attorney, Agent, or Firm* — Kwan & Okynick LLP

(57) ABSTRACT

Various examples of the present disclosure include techniques and mechanisms for providing a customizable visual and functional experience for a user of an application or service. According to various examples, a system includes a first visual interface that is mapped to a first feature set to operate together as a first user interface that is presented throughout the application or service when selected. The system further includes a second visual interface that is mapped to a second feature set to operate together as a second user interface that is presented throughout the application or service when selected. The first feature set and second feature set differ from each other and both the first user interface and second user interface are customizable.

20 Claims, 5 Drawing Sheets

(56) References Cited

U.S. PATENT DOCUMENTS

| | | | |
|---|---|---|---|
| 2014/0089134 A1 | 3/2014 | Linh et al. | |
| 2014/0100980 A1* | 4/2014 | Dingle | G06F 3/048 705/25 |
| 2014/0115466 A1* | 4/2014 | Barak | G06F 3/0484 715/716 |
| 2014/0173461 A1 | 6/2014 | Shahade | |
| 2014/0195936 A1* | 7/2014 | Cragun | G06F 3/0488 715/763 |
| 2014/0282101 A1* | 9/2014 | Beechuk | H04W 4/003 715/753 |
| 2014/0298193 A1* | 10/2014 | Kiss | G06F 3/0484 715/744 |
| 2015/0067531 A1* | 3/2015 | Adimatyam | G06F 3/0481 715/745 |
| 2015/0120414 A1* | 4/2015 | van Stolk | G06Q 30/06 705/14.16 |
| 2015/0127628 A1 | 5/2015 | Rathod | |
| 2016/0274776 A1* | 9/2016 | Scheff | G06T 11/60 |
| 2016/0306502 A1* | 10/2016 | Ramadge | G06F 9/451 |
| 2016/0307249 A1* | 10/2016 | Ku | G06Q 30/0613 |
| 2016/0314519 A1* | 10/2016 | Liu | G06Q 30/0641 |

\* cited by examiner

CUSTOMIZING THE VISUAL AND FUNCTIONAL EXPERIENCE OF AN APPLICATION

TECHNICAL FIELD

The present disclosure relates to presenting customized user experiences in computer applications, where the user experiences have distinct visual and functional aspects.

DESCRIPTION OF RELATED ART

Websites, as well as desktop and mobile applications, typically present a fixed visual and functional experience to a user. In particular, these websites or applications are usually viewable in one format by users. In the past, there have been some services that have let users control how other users see their content, such as Myspace. That service allowed each user to have a website with an appearance that could be tailored to the user's preferences. In that case, individual users controlled the way their own webpages were viewable to others, such that different Myspace webpages looked different, even though the same functionality was present on all of these webpages.

Other services allow a user to select a visual experience while using an application or service, such that all aspects of the service are viewed through this visual framework. In particular, the visual experience acts as a "skin" or a shell that overlays the whole application or service. For instance, WinAmp, a music player for Windows, provides different visual experiences that users can view when using their application. Different visual experiences may include players that look like retro cassette players or futuristic music players, but the functionality for each of these experiences remains the same.

Although various services have provided the opportunity for users or providers to select visual experiences presented to users of the services, the choices provided to the users and providers to customize these experiences have been limited. Moreover, providing a single visual and functional experience for one application or service does not always suit all use cases as well as the preferences of user. Accordingly, there is a need for providing a more customizable experience for applications and services.

Overview

Provided are various mechanisms and processes relating to providing a customizable visual and functional experience for an application or service.

In one aspect, which may include at least a portion of the subject matter of any of the preceding and/or following examples and aspects, a system includes a first visual interface that provides a first visual experience for a user of an application or service. The first visual experience includes a first theme and is customizable. A first feature set is mapped to this first visual interface. This first feature set provides a functional experience for the user and includes tools that allow the user to interact with the application or service. Together, the first visual interface and first feature set operate as a first user interface that is presented throughout the application or service. The system further includes a second visual interface that provides a second visual experience for the user of the application or service. The second visual experience includes a second theme and is customizable. A second feature set is mapped to the second visual interface. This second feature set provides a functional experience for the user and includes tools that allow the user to interact with the application or service. Together, the second visual interface and second feature set operate as a second user interface that is presented throughout the application. According to various examples, the first feature set and second feature set are customizable and different from each other.

According to various examples, a process for providing a customizable visual and functional experience for a user includes mapping a first feature set corresponding to an application or service with a first visual interface. The first feature set and first visual interface operate together as a first user interface, where the first feature set provides a functional experience for the user and the first visual interface provides a visual experience for the user. The process also includes mapping a second feature set corresponding to the application or service with a second visual interface. The second feature set and second visual interface operate together as a second user interface, where the second feature set provides a functional experience for the user and the second visual interface provides a visual experience for the user. According to various embodiments, the first user interface is different from the second user interface, in that the first feature set differs from the second feature set and the first visual interface differs from the second visual interface. Next, a request is received for the first user interface. The first feature set and first visual interface corresponding to the first user interface are then identified, and the first user interface is presented to the user. The process continues when a request is received for a first feature included in the first feature set, where the first feature is not included in the second feature set.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
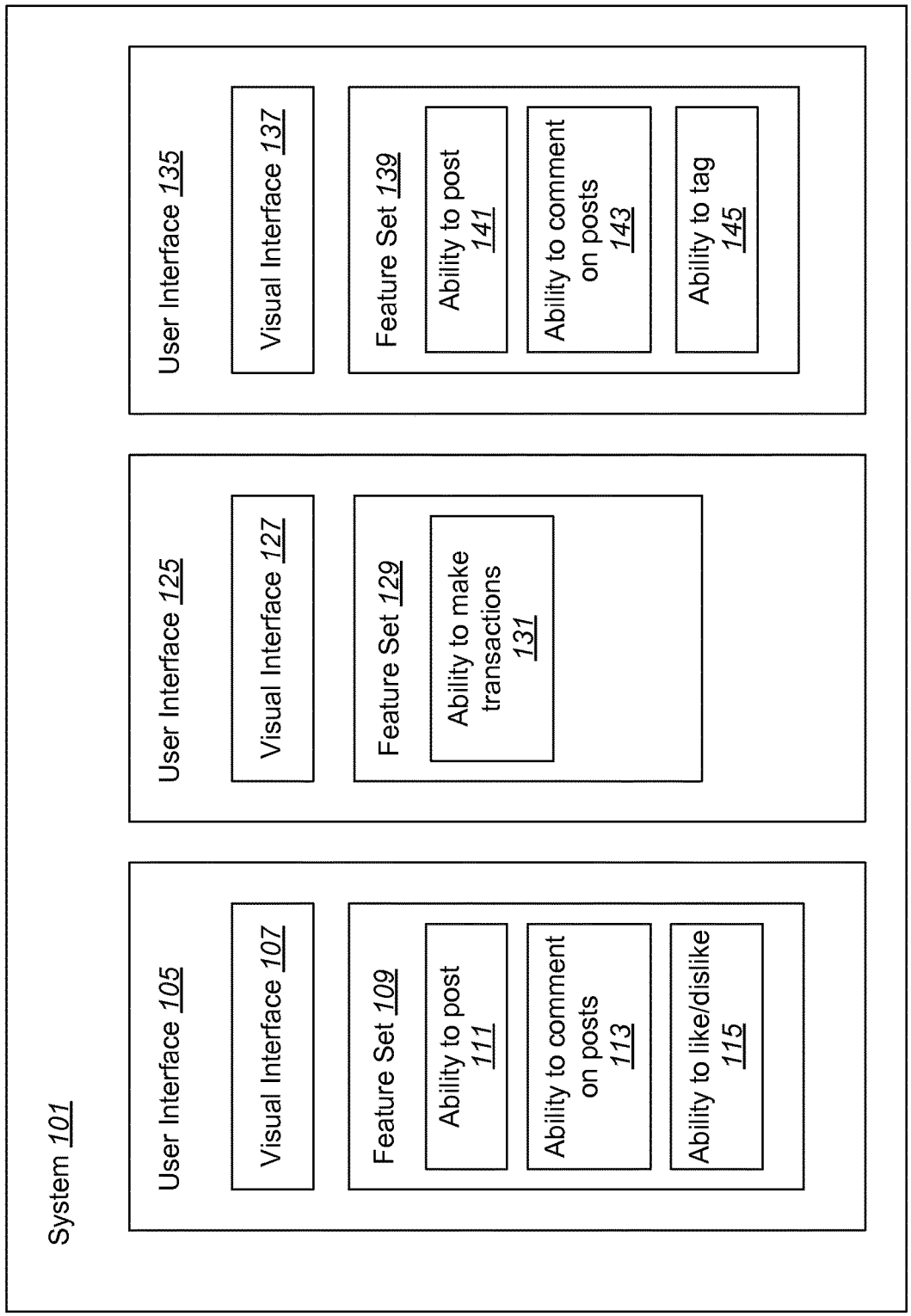
FIG. 1 illustrates an example of a system for presenting customized user experiences.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention. Various embodiments describe systems and processes relating to various entities and connections between various entities can include direct or indirect connections, and may include other entities between them. In addition, various embodiments describe applications and services. It should be noted that these embodiments can apply to either or both, and can also be used on different platforms such as websites, webpages, etc. Furthermore, the embodiments described can be used on various systems, such as computers, mobile devices, etc.

Websites, as well as desktop or mobile applications, typically present a fixed visual and functional experience to a user. Although some applications allow users to customize visual "skins" or shells for a webpage or app for others to view, or select these visual "skins" or shells to view a webpage or app themselves, the functionality for each of these experiences remains the same. Consequently, the choices provided to the users and providers of these applications or services to customize these experiences have been limited. Furthermore, having limited visual experiences and fixed functional experiences for a particular application or service does not always suit all use cases or preferences of the users.

Accordingly, various embodiments described herein provide systems and processes that allow more tailored approaches to providing a customized visual and functional experience depending on the application or service. In some cases, users have the chance to customize their visual and functional experiences, based on their preferences. In one example, application developers or other designers may develop various combinations of visual and functional interfaces that are selectable by users. In turn, different users having different preferences may prefer different experiences of the application or service and can choose different interfaces accordingly. The selectable interfaces will differ in both appearance and functionality. In other cases, influencers, such as a brand, company, store, organization, celebrity, person, or other entity, have the chance to customize the visual and functional experiences that their users, customers, fans, followers, or other viewers encounter when viewing the influencer's content. In particular, influencers might want to present a specific experience of an application to their fans, such that all of their fans experience the application the way the influencers intend them to experience it. Although influencers bring significant traffic to an application, service, or social network, prior systems typically do not allow these influencers any control or influence over the experience of the users besides of the content they post. In these cases, different influencers having a presence on a particular application or service may present interfaces with different appearances and functionality.

In some embodiments, specific visual and functional experiences are better tailored to specific user groups. For instance, one specific visual and functional experience would fit better for kids, whereas another visual and functional experience would fit better for car enthusiasts. Accordingly, specific user interfaces can be provided for each of these specific groups having appropriate visual and functional experiences.

According to various embodiments, users are able to create and/or use specifically tailored visual and functional experiences. Specifically, an entity such as a user, influencer, application developer, etc. creates a visual and functional experience for a given application. The user or other users can then select this visual and functional experience from within the application or outside of the application. The selected visual and functional experience then changes the visual interface as well as the functional interface of the whole application for that particular user.

With reference to FIG. 1, shown is one example of a system for presenting customized user experiences. The system 101 shown includes user interfaces 105, 125, and 135 that can also be referred to as user experiences. Although three user interfaces are included in this example, any number of user interfaces can be included.

In the present example, user interface 105 includes a visual interface 107 and feature set 109. The visual interface 107 provides a visual experience for a user of an application or service. This visual experience can include a theme that can include particular colors, patterns, pictures, illustrations, etc. For instance, visual interfaces can be themed for fashion, cars, music groups, sports teams, children's shows, time eras, art styles, etc. The feature set 109 is mapped to visual interface 107 such that the visual aspects of the visual interface 107 accommodate the functional aspects of the feature set 109 to provide a functional experience for the user. The feature set 109 includes tools that allow the user to interact with the application or service. This feature set 109 may be a subset of a larger set of features available through the application or service.

Some examples of functionalities that may be available as features include the ability to comment on posts (e.g. social media apps), the ability to make transactions (e.g. to buy items), the ability to post (e.g. social media apps), view particular information that is shown about a post, ability to like/dislike a post, ability to see and/or create tags in posts, ability to set limitations on the access of data/posts, ability to share/not share through social media or other communication platforms (e.g. facebook, twitter, email, etc.), ability to allow posts to get auto deleted after a certain amount of time, ability to link visual content together and show them side by side, and ability to embed various different types of visual media. Of course additional functionalities can also be provided depending on the application or service. As mentioned above, one functionality that may be provided is the ability to set limitations on the access of data/posts on the server side, database, etc. Setting such limitations can address the needs or interests of particular groups of users. For instance, a feature set may provide limitations that allow only content that is safe for children. This feature set could be presented as a particular user interface that provides a specific "experience" for child users. In another example, a feature set may provide limitations that allow only posts related to cars. This feature set could be presented along with a visual interface with a car-themed visual experience for car enthusiasts. In yet other examples, only certain people may have access to a certain "experiences," which are selectable as user interfaces. In these examples, a limited access "experience" will allow users to only see members of that group. Moreover, in certain instances, only users within this group will see what other members of the group are posting. These groups may provide limited access, such as with closed groups in which each user only sees content from other users in the group. Examples of groups that may wish to limit access to their content or users include members of a university, members of a club, members of a team, people from a specific city or country, etc.

In the present example, feature set 109 includes an ability to post 111, ability to comment on posts 113, and ability to like/dislike 115. The visual interface 107 and feature set 109 are mapped together such that the functional experience and visual experience are coordinated. This user interface 105 may be used with a social media application. For instance, this user interface may be themed with a particular musical group, and may include images and colors associated with the group. The feature set 109 may include the ability to post 111, ability to comment on posts 113, and ability to like/dislike 115 content. This user interface 105 may be an appropriate user experience for the music group's application or a user's interface with social media platforms.

In the present example, user interface 125 includes a visual interface 127 and feature set 129. As shown, visual interface 127 differs from visual interface 107, and feature set 129 differs from feature set 109. The visual interface 127 provides a visual experience for a user of an application or service. This visual experience can include a theme that can include particular colors, patterns, pictures, illustrations, etc. For instance, visual interfaces can be themed for fashion, cars, music groups, sports teams, children's shows, time eras, art styles, etc. The feature set 129 is mapped to visual interface 127 such that the visual aspects of the visual interface 127 accommodate the functional aspects of the feature set 129 to provide a functional experience for the user. The feature set 129 includes tools that allow the user to interact with the application or service. This feature set 129 may be a subset of a larger set of features available through the application or service, as described in more detail above.

In the present example, feature set 129 includes an ability to make transactions 131. For instance, this ability 131 may include the ability to buy, sell, or trade goods or services. The visual interface 127 and feature set 129 are mapped together such that the functional experience and visual experience are coordinated. This user interface 125 may be used with a shopping site. For instance, this user interface may be themed with a particular sports team, and may include images and colors associated with the team. The feature set 129 may include the ability to make transactions relating to team merchandise, tickets, etc. This user interface 125 may be an appropriate user experience for the team's shop, a team page within a larger online retail site, or a user's interface with various retail sites.

As mentioned previously, user interface 105 differs from user interface 125 in both visual experience and functional experience. Similarly, user interface 135 differs from both user interfaces 105 and 125 visually and functionally. In particular, user interface 135 includes a visual interface 137 and feature set 139. The visual interface 137 provides a visual experience for a user of an application or service. This visual experience can include a theme that can include particular colors, patterns, pictures, illustrations, etc. For instance, visual interfaces can be themed for fashion, cars, music groups, sports teams, children's shows, time eras, art styles, etc. The feature set 139 is mapped to visual interface 137 such that the visual aspects of the visual interface 137 accommodate the functional aspects of the feature set 139 to provide a functional experience for the user. The feature set 139 includes tools that allow the user to interact with the application or service. This feature set 139 may be a subset of a larger set of features available through the application or service, as described in more detail above.

In the present example, feature set 139 includes an ability to post 141, ability to comment on posts 143, and ability to tag 145. The visual interface 137 and feature set 139 are mapped together such that the functional experience and visual experience are coordinated. This user interface 135 may be used with a social media application. For instance, this user interface may be themed for a closed group, such as a club associated with a university, and may include images and colors associated with the group. The feature set 139 includes the ability to post 141, ability to comment on posts 143, and ability to tag 145 content. This user interface 135 may be an appropriate user experience for a user's interface with social media platforms, or the group's page or series of pages within a social media platform or website.

According to various embodiments, the user interfaces 105, 125, and 135 are customizable. In some embodiments, one or more of the user interfaces are customizable by the user. For instance, a user may be able to select a feature set that provides the functional experience that matches their preferences, and a visual interface that matches a theme that the user likes. The visual interface and feature set are mapped together to present a visual and functional experience for the user throughout the application or service. In another example, one or more user interfaces are customizable by an influencer. For instance, a particular company may want to control the image associated with its brand. Accordingly, the company may choose particular functionalities and themes that it would like users to associate with the brand. Selections for the visual interface and feature set are then mapped together to provide a visual and functional experience for visitors of their website, application, or pages within a larger website or application. In yet other examples, one or more user interfaces may be customizable by an application developer or other designer. For instance, an application developer may create a series of user interfaces tailored to different uses or users. These user interfaces can then be made available to users, and the users can select the user interface that suits their preferences most closely.

According to various embodiments, there are several ways that a user interface can be selected within an application or service. For instance, in a social application, a user can select a user interface via the profile of the influencer, store, or company. In another example, an "experience" store may offer different experiences that can be traded in different ways, such as for free, paid, or exchanged. In yet another example, "experiences" can be provided outside of an application or service using a selection tool such as a button on a website with information about which "experience" to load and a link that opens the application or service. Another example includes using a website, service, or app that has access to the users in-app profile to determine a preferred "experience" for the user and loading this "experience" when the application synchronizes with the server (e.g. application gets started and user logs in). In other examples, a user is presented with options for "experiences" when they initially use the application or service. Other options for selecting a user interface (i.e. "experience") are also possible.

According to various embodiments, providing alternative visual and functional experiences provides several advantages. In particular, each "experience" can provide a clean interface tailored to a specific task and the user can switch between "experiences" to obtain the optimal experience for each task. For example, an "experience" for fashion could allow for a very clean black and white design, with minimal buttons, where the visual information provided from a network or influencer would dominate. Such an "experience" could be created by a group of fashion designers and brands working in concert or by one specific famous influencer/fashion designer. Another advantage is that influencers can provide the user with a unique experience while also benefiting themselves with customized application "experiences." Specifically, even within an application that serves many different influencers, providing customized user experiences (i.e. user interfaces) makes it look like each influencer has its own application or website. In addition, according to various embodiments, a user does not have to leave an application and open another application to access a different user experience. In some examples, a user can access the same data from different viewpoints by tailoring the database behind the application according to the needs of a specific use case. Additionally, providing alternative visual and functional experiences can increase user satisfaction and enjoyment of the applications, thereby increasing traffic and usage of the applications or websites.

Figure 2:
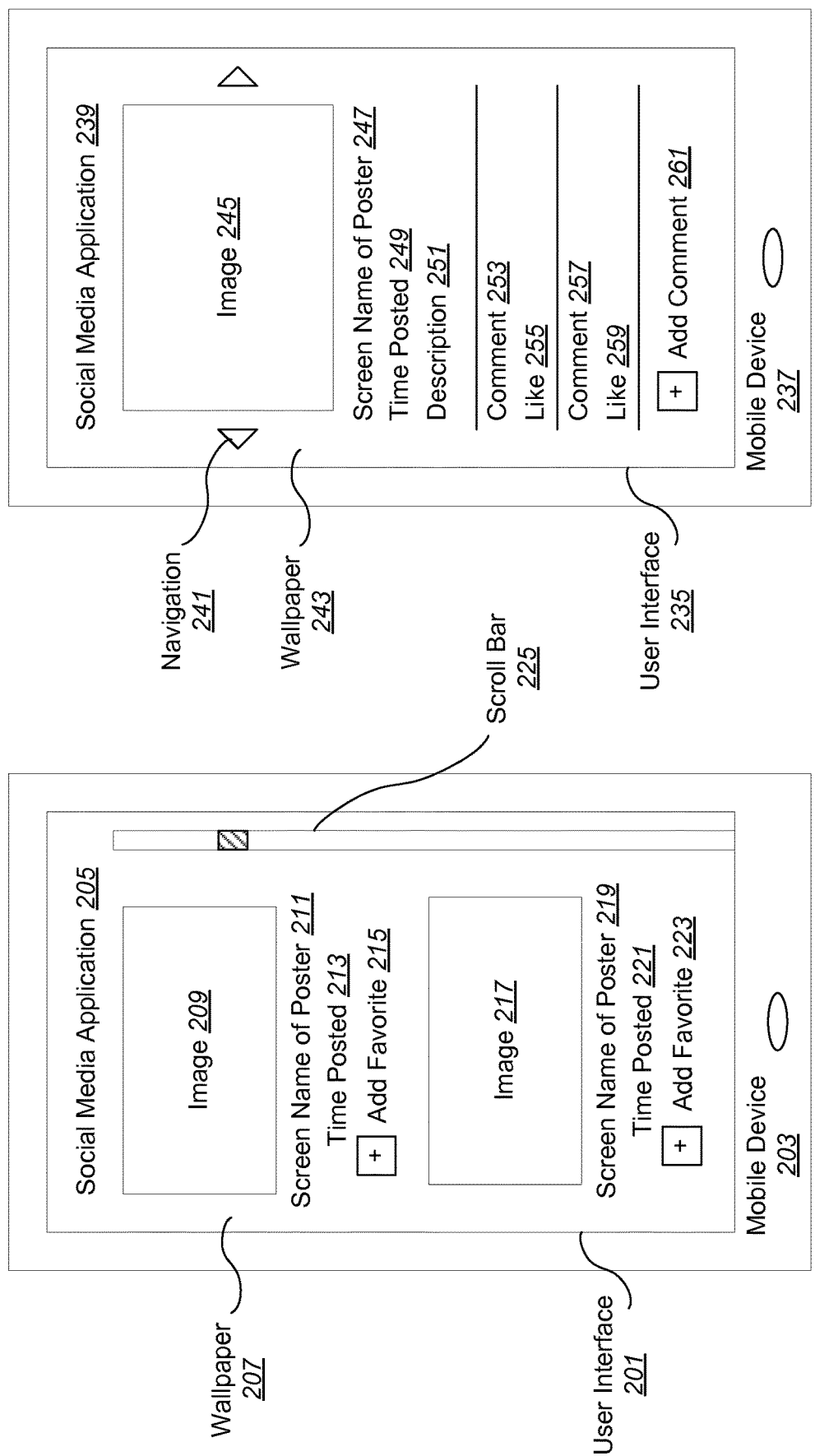
FIGS. 2A-2B illustrate examples of customized user experiences displayed on mobile devices.

With reference to FIGS. 2A-2B, shown are two examples of customized user experiences displayed on mobile devices. In particular, these represent two different user interfaces, as described in more detail above with regard to FIG. 1. User interface 201 differs from user interface 235 in both visual and functional aspects. As shown in FIG. 2A, user interface 201 displays a social media application 205 on mobile device 203. The visual interface includes wallpaper 207 and the visual layout of the display. For instance, the size and position of images 209 and 217, the fonts used to display the screen name of the poster 211 and 219, the time posted 213 and 221, and add favorite button 215 and 223 are all part of the visual experience. In addition, the look and placement of the scroll bar 225 is also part of the visual experience. The visual experience can include aspects such as themes, colors, patterns, images, etc. depending on the particular design.

In the present example, the feature set includes an image 209, 217 or thumbnail of an image or video, the screen name of the poster 211, 219, the time the image was posted 213, 221, the ability to add the image to favorites 215, 223, and the scroll bar 225. The feature set contributes to the functional experience of the user, in which various tools are accessible to the user during use of the application. Together, the feature set and other functional aspects of the user interface are mapped to the visual interface, such that the visual and functional experience operate together throughout the application. For instance, the wallpaper 207, colors, and fonts used will be consistent throughout the use of the application, such as when the user clicks an image to view more details, or navigates to another screen within the application.

As shown in FIG. 2B, user interface 235 displays a social media application 239 on mobile device 237. The visual interface includes wallpaper 243 and the visual layout of the display. For instance, the size and position of image 245, the fonts used to display the screen name of the poster 247, the time posted 249, description 251, comments 253 and 257, like buttons 255 and 259, and add comment button 261 are all part of the visual experience. In addition, the look and placement of the navigation buttons 241 are also part of the visual experience. The visual experience can include aspects such as themes, colors, patterns, images, etc. depending on the particular design.

In the present example, the feature set includes image 245 or thumbnail of an image or video, the screen name of the poster 247, the time posted 249, description 251, comments 253 and 257, like buttons 255 and 259, add comment button 261, and navigation buttons 241. The feature set contributes to the functional experience of the user, in which various tools are accessible to the user during use of the application. Together, the feature set and other functional aspects of the user interface are mapped to the visual interface, such that the visual and functional experience operate together throughout the application. For instance, the wallpaper 243, colors, and fonts used will be consistent throughout the use of the application, such as when the user clicks an image to view more details, or navigates to another screen within the application.

As shown, the visual and functional experiences differ between user interface 201 shown in FIG. 2A and user interface 235 shown in FIG. 2B. In particular, the feature set differs between the two, with different functional aspects included in each user interface. Additionally, the visual interfaces differ from each other in look and feel. The layout and placement of items in the two user interfaces 201 and 235 differ from each other, providing differences in the visual experiences of each. In addition, the themes, colors, fonts, etc. may also differ between the two user interfaces. However, in some examples, even if the themes, colors, fonts, etc. are the same or similar between the two user interfaces, 201 and 235, the layout and placement of items within the two user interfaces 201 and 235 will provide a user with different visual experiences. Although two examples of user interfaces are shown, any number of designs and features can be included in a user interface within the scope of this disclosure.

Figure 3:
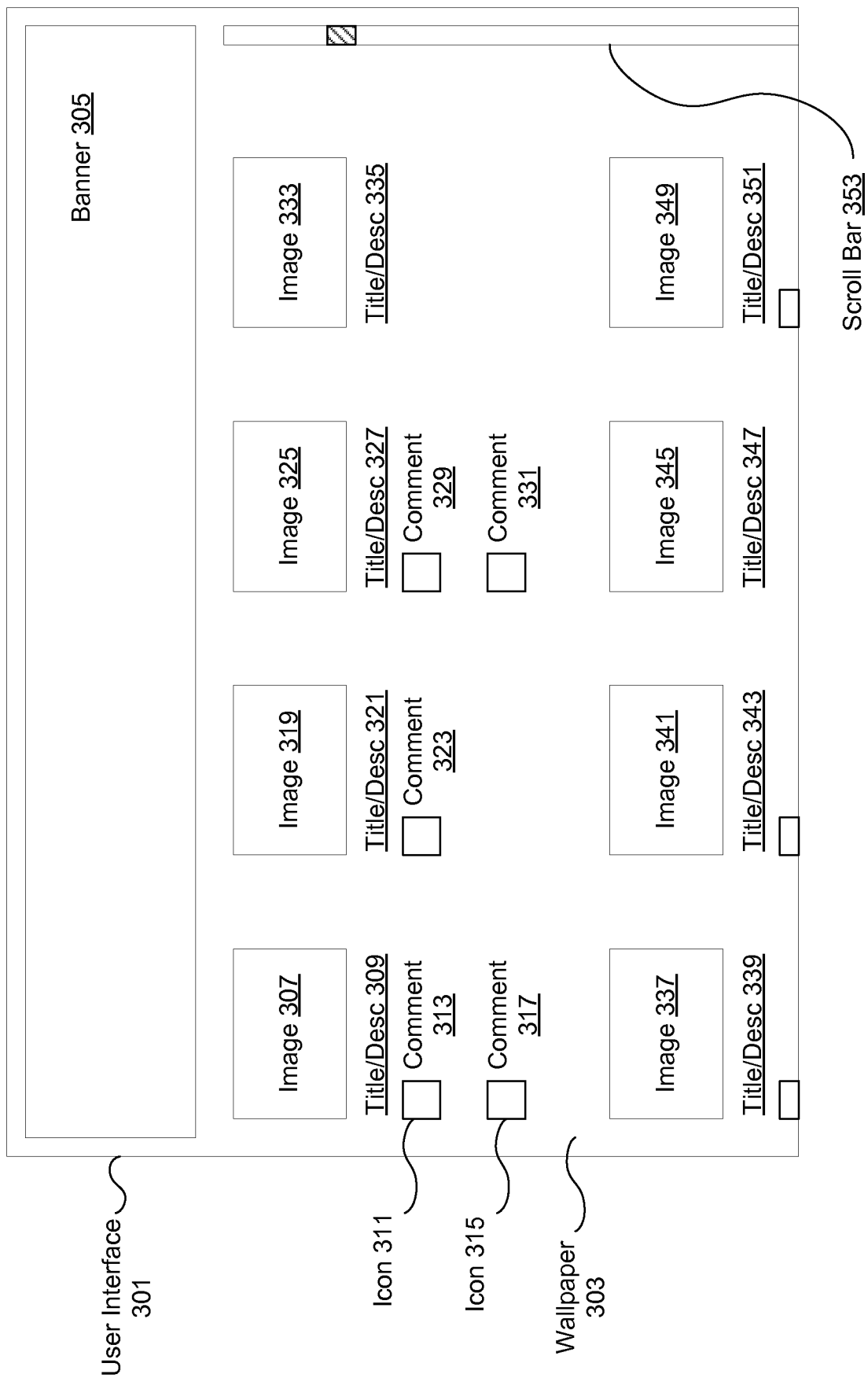
FIG. 3 illustrates one example of a customized user experience displayed on a computer screen.

With reference to FIG. 3, shown is one example of a customized user experience displayed on a computer screen. In particular, the user interface 301 represents a website displayed on a computer screen. As described above with regard to FIG. 1, a user interface 301 includes a visual interface and a feature set that operate together to provide a visual and functional experience for a user.

In the present embodiment, the visual interface includes wallpaper 303, banner 305, and the visual layout of the display. For instance, the size and position of images 307, 319, 325, 333, 337, 341, 345, and 349, and icons 311 and 315 (and others not labeled in the figure), as well as the fonts used to display the title/description 309, 321, 327, 335, 339, 343, 347, and 351 and comments 313, 317, 323, 329, and 331, are all part of the visual experience. In addition, the look and placement of the scroll bar 353 is also part of the visual experience. The visual experience can include aspects such as themes, colors, patterns, images, etc. depending on the particular design.

In the present example, the feature set includes images 307, 319, 325, 333, 337, 341, 345, and 349 or thumbnails of images or videos, icons 311 and 315 (and others not labeled in the figure), titles/descriptions 309, 321, 327, 335, 339, 343, 347, and 351, comments 313, 317, 323, 329, and 331, and scroll bar 353. The feature set contributes to the functional experience of the user, in which various tools are accessible to the user during use of the application. In this particular user interface 301, the user is able to view comments, but is not able to add any, so this may represent a user interface 301 tailored to a visitor that is not yet a member of the site. Other functionalities could be toggled based on the user's membership, etc. In the present example, the feature set and other functional aspects of the user interface are mapped to the visual interface, such that the visual and functional experience operate together throughout the website. For instance, the wallpaper 303, banner 305, colors, and fonts used will be consistent throughout the use of the website, such as when the user clicks an image to view more details, or navigates to another page within the website. Although one particular example of a user interface for a website is shown, various configurations for user interfaces can be implemented with different visual and functional experiences.

Figure 4:
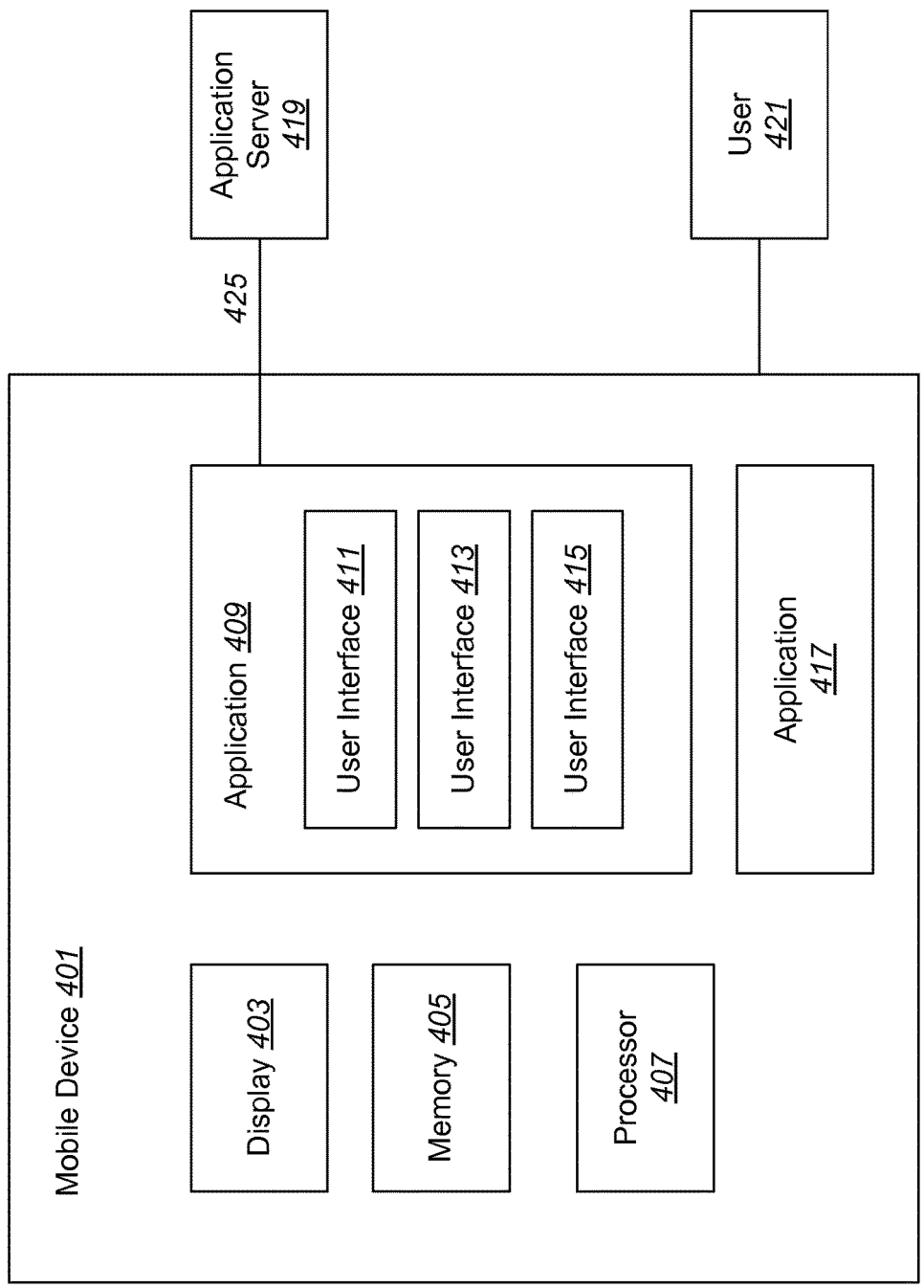
FIG. 4 illustrates one example of mobile device.

With reference to FIG. 4, shown is one example of mobile device. As shown, the mobile device 401 includes a display 403, memory 405, processor 407, application 409, and application 417. The mobile device 401 can be a smart phone, tablet device, or other mobile computing device. It should be noted that although the present example is described in the context of a mobile device, this or a similar configuration can be implemented on a computer or any other device. For instance, this configuration can be implemented on a home computer to allow access to customized user interfaces on various websites.

In the present example, display 403 can include a LED screen, LCD screen, or other screen that allows data to be viewed by a user. The display 403 may also include input functionalities in some examples, such as with a touch screen, or the like. In examples in which this system may be used outside of the context of mobile devices, such as desktop computers, the display may be part of the computer system, but may be external to the other components, such as with a computer monitor, television screen, etc.

In the present embodiment, the mobile device 401 uses memory 405 to store data and program instructions and maintain a local side cache. The program instructions may control the operation of an operating system and/or one or more applications, for example. The memory or memories may also be configured to store received metadata and batch requested metadata.

As shown in the present example, the processor 407 can be used to execute processes such as those associated with operating applications 409 and 417. When acting under the control of appropriate software or firmware, the processor 407 may be responsible for such tasks such as optimization. Various specially configured devices can also be used in place of a processor 407 or in addition to processor 407. In systems outside the mobile device context, such as with a desktop computer, the complete implementation can also be done in custom hardware.

According to various embodiments, applications 409 and 417 can be installed on the mobile device 401 and used for separate purposes. For instance, applications can be used for viewing news, playing games, social media, calendars, photo viewing/sharing, accessing websites in a mobile-friendly format, etc. As shown, application 409 includes user interfaces 411, 413, and 415. These user interfaces 411, 413, and 415 each represent different visual and functional experiences as described above with regard to FIG. 1. As also described above, these user interfaces 411, 413, and 415 can be accessed in a variety of ways, such as by purchase, trade, for free, etc. In the present example, the user interfaces 411, 413, and 415, however obtained, are stored on the mobile device 401 and associated with application 409. If a user selects a particular user interface 411, 413, and 415, this user interface will be implemented when the user launches the application 409. In some embodiments, application 409 can communicate through interface 425 with an application server 419 that is located remotely. The application server 419 may provide updates or additional user interfaces in some examples. In addition, this application server 419 may represent an app store in some instances.

In particular examples, the interface 425 may include separate input and output interfaces, or may be a unified interface supporting both operations. The interface 425 is typically configured to send and receive data packets or data segments over a network. Particular examples of interfaces the device supports include Ethernet interfaces, frame relay interfaces, cable interfaces, DSL interfaces, token ring interfaces, and the like.

In the present example, mobile device 401 also includes application 417, which represents any number of applications that can be installed on mobile device 401 in addition to application 409. This application may also include customizable user interfaces with varying visual and functional interfaces, just like application 409. In some examples, application 417 can detect what type of user interface is being used in application 409, and application 417 can implement a similar user interface, such as with a similar visual experience (e.g. themes, colors, layout), and similar functional experience (i.e. feature set). As shown, the user 421 interacts with mobile device 401 to access the applications 409 and 417, and to access application server 419.

According to various embodiments, because information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 5:
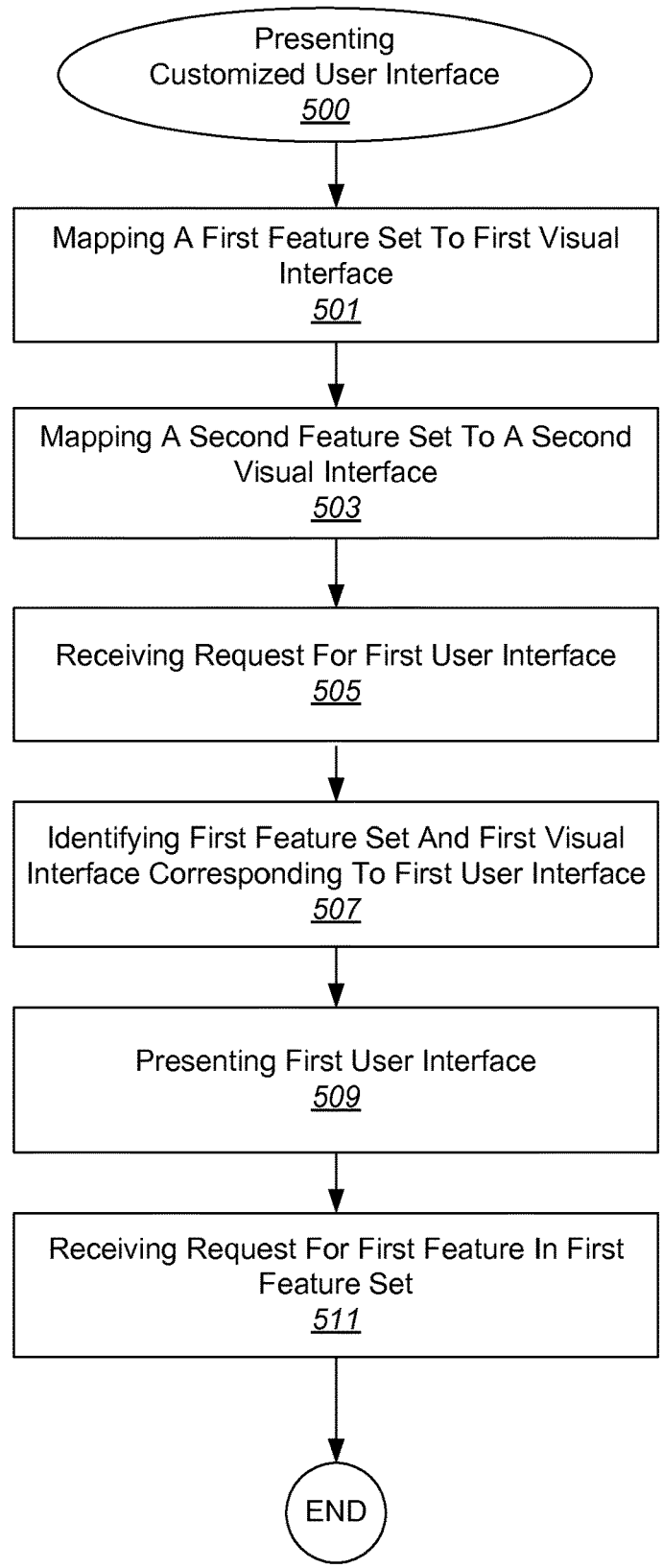
FIG. 5 illustrates one example of a process for presenting a customized user interface.

With reference to FIG. 5, shown is one example of a process for presenting a customized user interface that provides both a customized visual and functional experience for the user. In the present example the process 500 begins by mapping a first feature set for an application or service with a first visual interface at 501. As described above, this feature set provides a functional experience for the user and the visual interface provides a visual experience for the user. Together, the first feature set and first visual interface operate together as a first user interface. According to various embodiments, the first feature set can be chosen by a user, influencer, or developer, depending on the intended use of the first user interface. The customizer that chooses the first feature set can also choose the themes, layout, etc. for the first visual interface.

In the present example, the process continues by mapping a second feature set for the application or service with a second visual interface at 503. As described above, the feature set provides a functional experience for the user and the visual interface provides a visual experience for the user. Together, the second feature set and second visual interface operate together as a second user interface. In addition, the first user interface is different from the second user interface. Specifically, the first feature set differs from the second feature set and the first visual interface differs from the second visual interface. Examples of user interfaces with different feature sets and visual interfaces are described above with regard to various embodiments. According to various examples, the second feature set can be chosen by a user, influencer, or developer, depending on the intended use of the second user interface. The customizer that chooses the second feature set can also choose the themes, layout, etc. for the second visual interface. In some instances, the first visual interface and second visual interface may have the same theme but differ in aspects such as presentation of features, layout, etc.

In the present example, a request is then received for the first user interface at 505. For instance, a user may select from numerous user interfaces or may be presented with a default interface chosen by an influencer, developer, etc. If this is the default user interface, then the first user interface may be requested upon launch of the application or service. Other times that this request may be made includes when a user changes the user interface selection during use of the application or service.

Once the request for the first user interface is received, then the first feature set and first visual interface are identified at 507. As described above, the first feature set and first visual interface are presented together throughout the application or service as a unified first user interface. Next, the first user interface is presented to the user at 509. As the user interacts with the first user interface, the user may engage a first feature of the user interface. In response, the request for a first feature is received by the system. According to various embodiments, this first feature is included in the first feature set but not included in the second feature set.

According to various embodiments, the first feature set and the second feature set are subsets of a full feature set. A full feature set can include any number of features. In one example, the application is a social media or retail platform and the full feature set includes an ability to comment on posts, an ability to make transactions (e.g. buy or sell), an ability to post, an ability to view information that is shown about a post, an ability to like or dislike a post, an ability to see tags in posts, an ability to create tags in posts, and an ability to limit access to data or posts, ability to share/not share through social media or other communication platforms, ability to allow posts to get auto deleted after a certain amount of time, ability to link visual content together and show them side by side, and ability to embed various different types of visual media.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A system comprising:
a processor;
memory;
a first visual interface providing a first visual experience for a user of an application, the first visual experience including a first theme, wherein the first visual interface is customizable;
a first feature set mapped to the first visual interface, wherein the first feature set provides a functional experience through a first functional interface for the user and includes tools that allow the user to interact with the application, wherein the first feature set is customizable, wherein the first visual interface is mapped to the first feature set, such that the first visual interface and the first feature set operate together as a first user interface that is presented throughout the application;
a second visual interface providing a second visual experience for the user of the application, the second visual experience including a second theme, wherein the second visual interface is customizable; and
a second feature set mapped to the second visual interface, wherein the second feature set provides a functional experience through a second functional interface for the user and includes tools that allow the user to interact with the application, wherein the second feature set is customizable, wherein the second visual interface is mapped to the second feature set, such that the second visual interface and the second feature set operate together as a second user interface that is presented throughout the application, wherein the first feature set and second feature set are different from each other, wherein changes in a feature set changes both the corresponding visual interface and the corresponding functional interface,
wherein the first visual interface includes the first theme and the second visual interface includes the second theme, the first theme being different from the second theme,
wherein a second application can detect whether the application is using one of the first visual interface and the second visual interface and subsequently implements a third visual interface similar to the detected one of the first and second visual interface for the user to interact with the second application, wherein the second application is different from the application, and
wherein the first feature set includes a functionality for limiting access to a first subset of data and the second feature set includes a functionality for limiting access to a second subset of data.

2. The system of claim 1, wherein the first feature set is a subset of a full feature set.

3. The system of claim 2, wherein the application is a social media platform, and wherein the full feature set includes an ability to comment on posts, an ability to make transactions, an ability to post, an ability to view information that is shown about a post, an ability to like or dislike a post, an ability to see tags in posts, an ability to create tags in posts, and an ability to limit access to data or posts.

4. The system of claim 3, wherein the ability to make transactions includes an ability to purchase an item.

5. The system of claim 1, wherein the first visual interface and first feature set are customizable by the user.

6. The system of claim 1, wherein the first visual interface and first feature set are customizable by an influencer, wherein the influencer is a brand, company, store, organization, celebrity, person, or entity.

7. The system of claim 1, wherein the first user interface and second user interface are customizable by an application developer.

8. The system of claim 1, wherein the first user interface and second user interface are customizable by an influencer.

9. The system of claim 1, wherein the first visual interface is different from the second visual interface.

10. The system of claim 1, wherein the first visual interface and the second visual interface are selectable by a user.

11. A method comprising:
mapping, via a processor, a first feature set corresponding to an application with a first visual interface, the first feature set providing a functional experience through a first functional interface for a user and the first visual interface providing a visual experience for the user, wherein the first visual interface is mapped to the first feature set, such that the first visual interface and the first feature set operate together as a first user interface;
mapping, via the processor, a second feature set corresponding to the application with a second visual interface, the second feature set providing a functional experience through a second functional interface for the user and the second visual interface providing a visual experience for the user, wherein the second visual interface is mapped to the second feature set, such that the second visual interface and the second feature set operate together as a second user interface, wherein the first user interface is different from the second user interface, the first feature set differing from the second feature set and the first visual interface differing from the second visual interface;

receiving, via the processor, a request for the first user interface;

identifying, via the processor, the first feature set and first visual interface corresponding to the first user interface;

presenting, via the processor, the first user interface to the user; and receiving, via the processor, a request for a first feature included in the first feature set, the first feature not included in the second feature set, wherein changes in a feature set changes both the corresponding visual interface and the corresponding functional interface, wherein the first visual interface includes the first theme and the second visual interface includes the second theme, the first theme being different from the second theme, wherein a second application can detect whether the application is using one of the first visual interface and the second visual interface and subsequently implements a third visual interface similar to the detected one of the first and second visual interface for the user to interact with the second application, and wherein the first feature set includes a functionality for limiting access to a first subset of data and the second feature set includes a functionality for limiting access to a second subset of data.

12. The method of claim 11, wherein the first feature set is a subset of a full feature set.

13. The method of claim 12, wherein the application is a social media platform, and wherein the full feature set includes an ability to comment on posts, an ability to make transactions, an ability to post, an ability to view information that is shown about a post, an ability to like or dislike a post, an ability to see tags in posts, an ability to create tags in posts, and an ability to limit access to data or posts.

14. The method of claim 13, wherein the ability to make transactions includes an ability to purchase an item.

15. The method of claim 11, wherein aspects of the first user interface are customized by a user, wherein the user selects a theme for the first visual interface and items in the first feature set.

16. The method of claim 11, wherein aspects of the first user interface are customized by an influencer, wherein the influencer selects a theme for the first visual interface and items in the first feature set, wherein the influencer is a brand, company, store, organization, celebrity, person, or entity.

17. The method of claim 11, wherein the first user interface and second user interface are customizable by an application developer.

18. The method of claim 11, wherein the first user interface and second user interface are customizable by an influencer.

19. The method of claim 11, wherein the first visual interface and second visual interface have a same theme but differ in presentation of features.

20. A non-transitory computer readable medium comprising instructions for causing a processor and memory to execute a method, the method comprising:

mapping a first feature set corresponding to an application with a first visual interface, the first feature set providing a functional experience through a first functional interface for a user and the first visual interface providing a visual experience for the user, wherein the first visual interface is mapped to the first feature set, such that the first visual interface and the first feature set operate together as a first user interface;

mapping a second feature set corresponding to the application with a second visual interface, the second feature set providing a functional experience through a second functional interface for the user and the second visual interface providing a visual experience for the user, wherein the second visual interface is mapped to the second feature set, such that the second visual interface and the second feature set operate together as a second user interface, wherein the first user interface is different from the second user interface, the first feature set differing from the second feature set and the first visual interface differing from the second visual interface;

receiving a request for the first user interface;

identifying the first feature set and first visual interface corresponding to the first user interface;

presenting the first user interface to the user; and receiving a request for a first feature included in the first feature set, the first feature not included in the second feature set, wherein changes in a feature set changes both the corresponding visual interface and the corresponding functional interface, wherein the first visual interface includes the first theme and the second visual interface includes the second theme, the first theme being different from the second theme, wherein a second application can detect whether the application is using one of the first visual interface and the second visual interface and subsequently implements a third visual interface similar to the detected one of the first and second visual interface for the user to interact with the second application, and wherein the first feature set includes a functionality for limiting access to a first subset of data and the second feature set includes a functionality for limiting access to a second subset of data.

* * * * *